Feb. 28, 1956   A. BOSCHI   2,736,067
BEDDING AND POINTING OF FIXED GLASSES ON MOTOR CAR BODIES
Filed Nov. 26, 1951
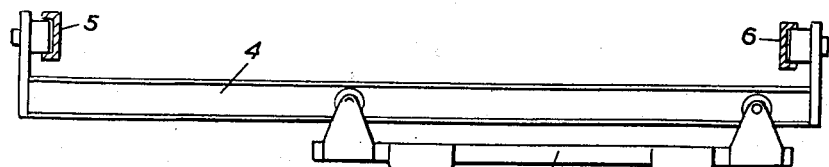
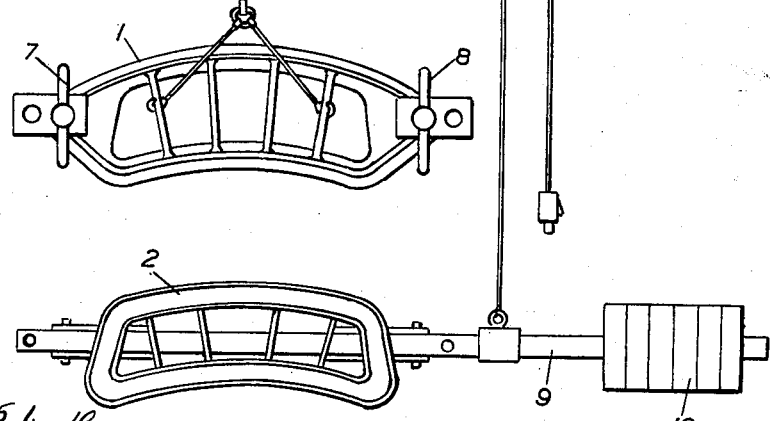
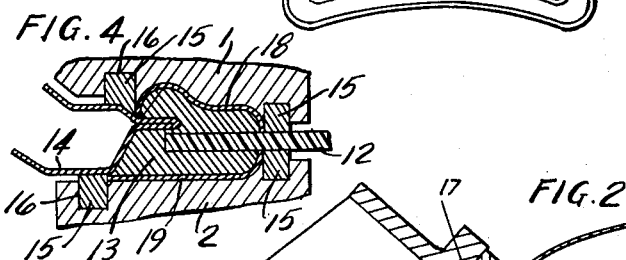
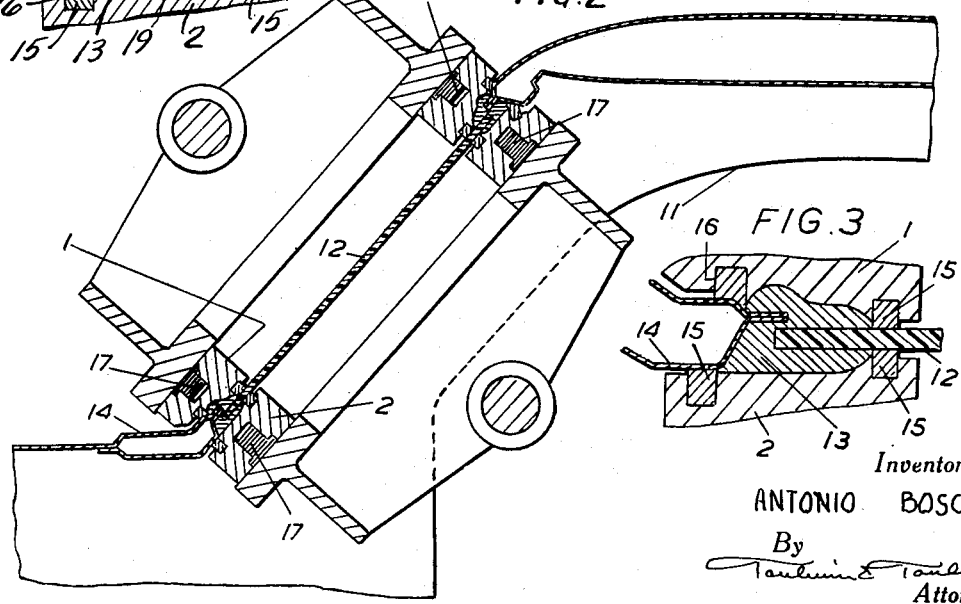
Inventor
ANTONIO BOSCHI
By
Attorney

United States Patent Office 2,736,067
Patented Feb. 28, 1956

2,736,067

BEDDING AND POINTING OF FIXED GLASSES ON MOTOR CAR BODIES

Antonio Boschi, Milan, Italy, assignor to Pirelli Societa per Azioni, Milan, Italy, a limited liability company of Italy Application November 26, 1951, Serial No. 258,248

Claims priority, application Italy December 22, 1950

5 Claims. (Cl. 18—59)

This invention relates to the bedding and pointing of fixed glasses on motor car bodies.

Prevulcanised rubber packings are usually employed for the bedding and pointing of windscreens, windows and like fixed glasses on motor car bodies, said packings being secured by means of mastics or other adhesive means, to the glass panel on the one hand and to the body plate on the other. A number of different operations are therefore required to be performed in carrying into effect this method, which tends to render the method costly. In addition the method has many technical drawbacks; more particularly it is difficult to ensure the required permanent tightness of joint as between the glass panel, the body plate and the packing.

Various improvements have been proposed in order to avoid these difficulties, including one which consists in attaching the prevulcanised rubber packing to the glass panel by a pressing operation, for example after application of a metal coating to the edges of the panel. In this way the required adhesion is ensured. None of the improvements so far proposed, however, wholly achieves the intended purpose, principally because they leave unsolved the problem of effective adhesion between the packing and the body plate.

A development of the method just alluded to using a pressing operation consists in pressing on the rubber packing both to the glass panel on the one hand and also to a framing of metal plate (which framing is subsequently attached to the car body) on the other. Various inconveniences are, however, encountered in carrying this development into effect. For example, the body section to which the glass panel is to be fitted is often made in one piece with the roof and the rear part of the body, with the result that its shape and size tend to be such as to prevent the fitting of the parts in a mould and the subsequent pressing of the assembled parts in a conventional press of the type usually employed for rubber articles. Also, the body section in question has often to be welded to other sections by a weld bead located very near to the glass panel and sometimes even directly against the packing. Finally, the car body, after having been moulded and then fitted with the glass panels and pressed-on rubber packings, has to be submitted to a series of enamelling and finishing operations which, with the latest types of enamels, involve heat treatments tending to be extremely prejudicial to rubber.

According to the present invention, the problem of ensuring permanent tightness of the joint between the fixed glass panel and the body plating without having recourse to adhesive means has been solved by a process which is characterised in that (a) the operations involved are performed during the fabrication of the car body on an assembly line and (b) said operations comprise first pressing an unvulcanised rubber or unresinified plastic packing onto an already moulded and enamelled car body, and simultaneously onto the glass panel, with the use of a portable mould which can be readily fitted onto and removable from the car body at selected positions along the assembly line, and then vulcanising or resinifying the pressed-on packing still in position in the mould by the application of heat thereto, the mould which is used in these operations being provided with means to ensure accurate location of the glass panel with respect to the mould on the one hand and the car body on the other, means to apply the necessary pressure for the pressing-on of the packing, which pressure is preferably continued during the vulcanisation or resinification of the pressed-on packing, and means to apply the necessary heat to the packing to produce the vulcanisation or resinification thereof.

The packing, when applied in this manner, requires no further deformation in the assembling operations, as it does with all other procedures heretofore proposed, with the result that it becomes possible to attach ornamental bright metal framings to the outer surfaces of the packings while the latter are being pressed on, said packing being composed of plates of rigid material shaped to conform to the inner surfaces of the mould halves. Such framings can be given a width considered most suitable from aesthetic viewpoints, and they can even be made to cover the whole section of the packing that would otherwise be visible. Such attachment of ornamental framings is made possible also by the fact that the rubber or plastic of the packing is attached on both faces thereof to two rigid bodies (the body plating and ornamental framing), whereby the stresses caused by shrinking of the rubber or plastic during or after vulcanisation or resinification are symmetrically distributed and do not tend to bend the packing.

As to details relative to carrying the invention into effect, the following should be observed:

(1) The adhesion of the rubber or plastic to the glass and the body plating can be effected while the rubber or plastic is being vulcanised, by having recourse to any of the many systems already known. Should, in particular, the strength of the attachment be prejudiced by the type of varnish used, then the edge of the body plating could be protected while the varnish is being applied, by any of the means usually employed for this purpose (e. g. a strip of paper applied to the edge), the edge of the plate being thereby left bright.

(2) The accurate location of the glass panel with respect to the mould can be obtained by cupping means or by any other known mechanical systems. After the glass panel has been adjusted with respect to the mould, as for instance by means of cupping glasses, the mould can be fitted onto the car body by means of adjustable stops as usually employed for templates and the like.

(3) The closing of the two mould halves (one of these being fitted on the inside and the other on the outside of the car body) can be effected by conventional mechanical means (e. g. toggle levers, screw means or the like) acting on exterior elements located in the door openings, at the two ends of the windscreen.

(4) The pressure required for the moulding operation can be applied by the same means as are used for closing the mould halves, possibly with the interposition of calibrated springs, in order to ensure the continuity of the pressure even during the vulcanisation or resinification; alternatively the pressure may be applied by means of air bags, i. e. rubber pockets into which a pressure fluid is forced.

(5) The heat required for the vulcanisation can be derived from steam or some other fluid at the requisite raised temperature, flowing through a number of grooves machined on the opposite mould faces; alternatively it may be obtained by electrical heating of the two halves of the mould, or again by forcing a hot fluid through an airbag placed in contact with the parts to be heated.

The accompanying drawings illustrate the invention by way of example, as applied to the fitting of a windscreen to a car body.

In these drawings:

Figure 1 is a view, looking in the direction of length of a car assembly line, at the point therealong whereat the operations involved in the present invention are performed, the figure showing the two halves of the mould which is used in these operations and the means by which they are moved into position relatively to the car body;

Figure 2 is a fragmentary view, drawn on a larger scale than Figure 1, of the car body with the two mould halves fitted thereonto, over the windscreen opening in the front of the body with the glass panel to form the windscreen in located position relatively to the mould halves and the packing also in position therein, filling the interior space of the closed mould;

Figure 3 is an enlarged fragmentary sectional view through the closed mould, the glass panel and the packing this figure being included to show the parts referred to more clearly than they appear in Figure 2, and Figure 4 is a view similar to Figure 3, illustrating the case whereas hereinbefore described ornamental framings are attached to the outer surfaces of the packing during the operation of fixing the glass panel.

Like reference characters are applied to like parts in the various figures.

Referring to Figure 1, the two mould halves are marked 1 and 2 in this figure. As shown, the two halves are suspended from an overhead gantry 3 traversible along a rail 4 extending transversely to the assembly line, which rail 4 is in turn traversible along a pair of rails 5 and 6 extending longitudinally of the assembly line. Mould half 1 occupies an exterior position and mould half 2 an interior position relatively to the car body during the operations involved in the present invention, the two halves being clamped together in the manner above described, by means represented substantially diagrammatically at 7 and 8. It will be seen that mould half 2 is suspended from the gantry through the intermediary of a horizontal bearer bar 9, being mounted upon this bar near one end thereof, while at the opposite end of the bar is a weight 10 effective to counterbalance the bar about its point of suspension from the gantry. In this way it is readily possible to introduce the mould half 2 in position in the car body by way of one of the door openings thereof (shown at 11 in Figure 2), or in the case of fitting a rear window to the body, by way of one of the side window openings thereof.

Referring now in greater detail to Figures 2 and 3, the glass panel is shown in these figures at 12, the packing at 13 and the car body at 14, while at 15 are shown rubber fillets let into recesses 16 in the corresponding mould half 1 or 2 and serving to define the lateral boundaries of the interior space of the closed mould along the lines of the inner and outer edges of the packing. As will be seen from Figure 3, the design of the mould halves is such as to permit them to be clamped together by the clamping means 7 and 8 hereinbefore referred to, sufficient clearance being left for this purpose between the exterior edges of the recesses 16 in which the fillets 15 are located.

The form of the invention illustrated in Figures 2 and 3 is one in which the mould halves are heated by electric resistance heaters 17, shown in Figure 2.

Referring finally to Figure 4, the ornamental framings which are attached to the packing during the operation of fixing the glass panel are marked 18, 19. They are placed within the mould halves so as to intervene therein between the inner surfaces of the mould halves and the packing 13. During the curing of the packing the framings become permanently bonded thereto.

The means hereinbefore referred to for accurately locating the glass panel with respect to the mould on the one hand and the car body on the other, which means are not shown on the drawings as they may take any convenient form, e. g. the form already mentioned of cupping devices (by which is meant rubber or like resilient hemispherical fittings which after having been compressed against a plane surface such as that of a glass plate adheres to it on account of the depression produced within the fitting by the resile thereof due in turn to the resilience of the rubber or like material of which the fitting is composed), would be mounted upon the framework of the mould in any convenient position thereon.

What I claim as my invention and desire to secure by Letters Patent of the United States is:

1. A method of fixing an unframed windscreen, window or like glass panel in its opening in an already finally shaped and enamelled motor car body, said method comprising the steps of (1) assembling in predetermined position relatively to one another and to said opening (a) the panel to be fixed, said panel being placed in the position it has finally to occupy in the opening, (b) two internally heated mutually complementary mould halves, said mould halves being so placed, one on either side of a marginal portion of the panel extending along the edges thereof and also of a marginal portion of the car body extending along the edge of the opening therein, as to define a closed space into which said marginal portions extend with a gap between them, one of said mould halves when so placed being on the outside of the car body and the other on the inside thereof, and (c) a mass of thermo-curing jointing material in uncured condition, said mass filling said space; (2) applying by means of said mould halves heat and pressure to said material filling said space so as to cure the same in situ therein, transforming it into a moulding constituting a permanent connection between the panel and the car body, said moulding having the interior shape of the mould halves and being permanently bonded to said marginal portions; and (3) removing the mould halves from the said moulding.

2. A method of fixing an unframed windscreen, window or like glass panel in its opening in an already finally shaped and enamelled motor car body, said fixing being performed during fabrication of the car body on an assembly line, said method comprising the steps of (1) assembling in predetermined position relatively to one another and to said opening (a) the panel to be fixed, said panel being placed in the position it has finally to occupy in the opening, (b) two internally heated mutually complementary mould halves, said mould halves being so placed, one on either side of a marginal portion of the panel extending along the edge thereof and also of a marginal portion of the car body extending along the edge of the opening therein, as to define a closed space into which said marginal portions extend with a gap between them, one of said mould halves when so placed being on the outside of the car body and the other on the inside thereof, and (c) a mass of thermo-curing jointing material in uncured condition, said mass filling said space; (2) applying by means of said mould halves heat and pressure to said material filling said space so as to cure the same in situ therein, transforming it into a moulding constituting a permanent connection between the panel and the car body, said moulding having the interior shape of the mould halves and being permanently bonded to said marginal portions; and (3) removing the mould halves from the said moulding, said mould halves being entirely separate from one another and also separately supported in readiness for bringing into operative position relatively to the car body, one exteriorly of the body and the other interiorly thereof, the one last mentioned being introduceable into the body by way of a suitably positioned opening, as a door opening, therein.

3. The method of claim 1 in a form wherein the thermo-curing jointing material is a vulcanisable rubber mix.

4. The method of claim 2 in a form wherein the thermo-curing jointing material is a vulcanisable rubber mix.

5. The method of claim 1 in a form wherein an ornamental plate, adapted to form a decorative facing over the moulding which is formed permanently connecting the glass panel to the car body, is placed inside one of the mould halves so as to intervene between the mass of jointing material therein and the inner surface of the mould half during the operation of fixing the panel to the car body, said plate being a rigid member pre-shaped to the form of said inner surface and becoming permanently bonded to said mass during said operation.

References Cited in the file of this patent

UNITED STATES PATENTS

| | | |
|---|---|---|
| 1,841,745 | Lawson | Jan. 19, 1932 |
| 1,958,141 | Haushalter | May 8, 1934 |
| 2,093,614 | Lynch | Sept. 21, 1937 |
| 2,150,282 | Lord et al. | Mar. 14, 1939 |
| 2,173,186 | Swartz et al. | Sept. 19, 1939 |
| 2,382,963 | Dodge | Aug. 21, 1945 |
| 2,402,717 | Winer | June 25, 1946 |
| 2,482,239 | Botwinick | Sept. 20, 1949 |
| 2,522,324 | Wilkerson | Sept. 12, 1950 |

FOREIGN PATENTS

| | | |
|---|---|---|
| 584,932 | Great Britain | Jan. 27, 1947 |